United States Patent [19]

Neeff et al.

[11] 4,319,025
[45] Mar. 9, 1982

[54] ANTHRAQUINONE-AZOMETHINE COMPOUNDS, PROCESSES FOR THEIR PREPARATION AND PROCESSES FOR DYEING SYNTHETIC FIBRE MATERIALS AND FOR PIGMENTING ORGANIC MACROMOLECULAR SUBSTANCES

[75] Inventors: Rütger Neeff; Meinhard Rolf; Walter Müller, all of Leverkusen, Fed. Rep. of Germany

[73] Assignee: Bayer Aktiengesellschaft, Leverkusen, Fed. Rep. of Germany

[21] Appl. No.: 170,449

[22] Filed: Jul. 21, 1980

[30] Foreign Application Priority Data

Aug. 4, 1979 [DE] Fed. Rep. of Germany ....... 2931710

[51] Int. Cl.³ .......................................... C07D 213/68
[52] U.S. Cl. ...................................... 542/415; 8/506;
    8/508; 8/509; 8/510; 8/513; 8/512; 8/514;
    8/515; 8/516; 8/518; 8/519; 8/637; 8/677
[58] Field of Search .......................... 542/415

[56] References Cited

U.S. PATENT DOCUMENTS

| | | | |
|---|---|---|---|
| 4,078,086 | 3/1978 | Winkelmann et al. | 542/415 X |
| 4,122,117 | 10/1978 | Ando et al. | 542/420 X |
| 4,131,676 | 12/1978 | Lang et al. | 542/415 X |
| 4,246,401 | 1/1981 | Neeff et al. | 542/420 X |

FOREIGN PATENT DOCUMENTS 8063 1/1970 European Pat. Off. .
2025429 4/1969 Fed. Rep. of Germany .

OTHER PUBLICATIONS

Chemical Abstracts, Band 86, 1977, Seite 73, Nr. 107999k, Columbus, Ohio USA, JP-A-76 140 926 (Dainippon Ink and Chemicals) (04-12-1976).

Primary Examiner—Arthur P. Demers
Attorney, Agent, or Firm—Sprung, Felfe, Horn, Lynch & Kramer

[57] ABSTRACT

Anthraquinone-azomethine compounds of the formula

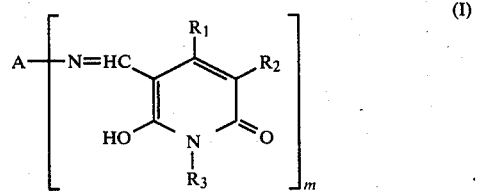

or of the tautomeric formula

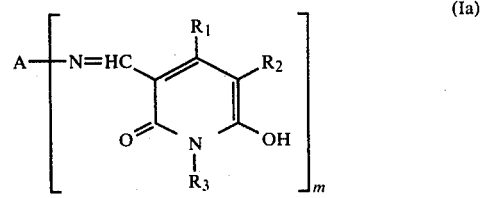

or of the tautomeric formula

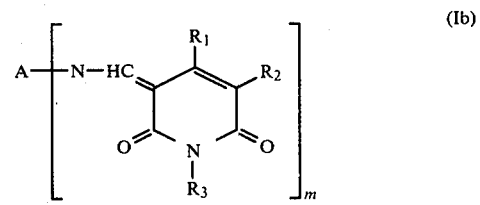

in which
A denotes an anthraquinone radical which is free from sulphonic acid groups and optionally further substituted and which preferably consists of at most 5 fused rings,
$R_1$ denotes hydrogen, $C_1$–$C_4$-alkyl, hydroxy-$C_1$–$C_4$-alkyl, optionally substituted phenyl, carboxyl, carboxylic acid, $C_1$–$C_4$-alkyl ester or hydroxyl,
$R_2$ denotes hydrogen, halogen, nitro, cyano, optionally substituted carbamoyl or optionally substituted sulphamoyl, sulphonic acid $C_1$–$C_4$-alkyl ester, sulphonic acid aryl ester, $C_1$–$C_4$- alkylcarbonyl, $C_1$–$C_4$-alkoxycarbonyl, optionally substituted benzoyl, alkyl or optionally substituted phenyl sulphone, or a hetero-aromatic radical, for example a radical of the formula

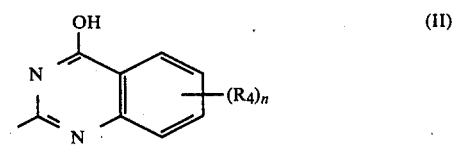

or of the formula

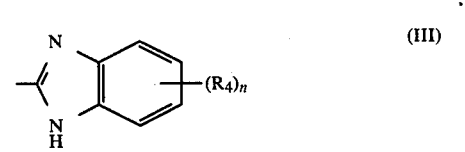

or of the formula

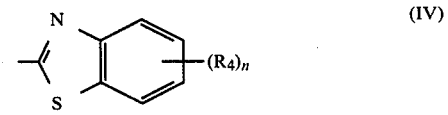

$R_3$ denotes optionally substituted aryl or hetero-aryl, cycloalkyl or $C_1$–$C_{12}$-alkyl, it being possible for the alkyl chain to be interrupted by oxygen or sulphur and/or substituted by hydroxyl, $N(R_5)_2$— or —$N(R_5)_3^\oplus X^\ominus$ groups, $R_4$ denotes a substituent, $R_5$ denotes hydrogen, $C_1$–$C_4$-alkyl, cycloalkyl or optionally substituted aryl, X denotes an anion, m denotes 1, 2, 3 or 4 and n denotes 0, 1, 2, 3 or 4, processes for their preparation and processes for dyeing synthetic fibre materials and for pigmenting organic macromolecular substances using the new anthraquinone-azomethine compounds.

3 Claims, No Drawings

ANTHRAQUINONE-AZOMETHINE COMPOUNDS, PROCESSES FOR THEIR PREPARATION AND PROCESSES FOR DYEING SYNTHETIC FIBRE MATERIALS AND FOR PIGMENTING ORGANIC MACROMOLECULAR SUBSTANCES

The invention relates to anthraquinone-azomethine compounds which, in one of their tautomeric structures, correspond to the formula

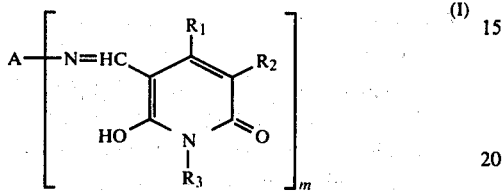

processes for their preparation and their use as pigments and dyestuffs for synthetic fibre materials.

Further tautomeric forms of the compounds according to the invention correspond to the formulae

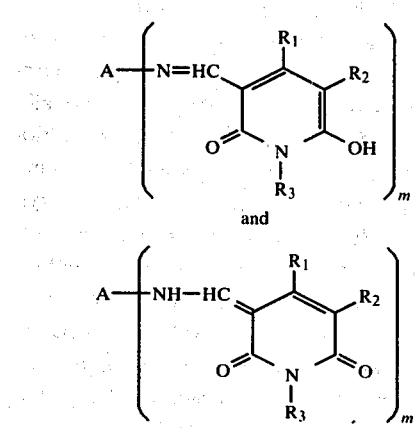

For simplicity, in each case only the tautomeric form represented by formula (I) is given in the following text. However, it is emphasised that this does not mean a restriction of the invention with regard to a particular tautomer.

In the formula (I),

A denotes an anthraquinone radical which is free from sulphonic acid groups and optionally further substituted and which preferably consists of at most 5 fused rings, $R_1$ denotes hydrogen, $C_1-C_4$-alkyl, hydroxy-$C_1-C_4$-alkyl, optionally substituted phenyl, carboxyl, carboxylic acid $C_1-C_4$-alkyl ester or hydroxyl, $R_2$ denotes hydrogen, halogen, nitro, cyano, optionally substituted carbamoyl or optionally substituted sulphamoyl, sulphonic acid $C_1-C_4$-alkyl ester, sulphonic acid aryl ester, $C_1-C_4$-alkylcarbonyl, $C_1-C_4$-alkoxycarbonyl, optionally substituted benzoyl, alkyl or optionally substituted phenyl sulphone, or a hetero-aromatic radical, for example a radical of the formula

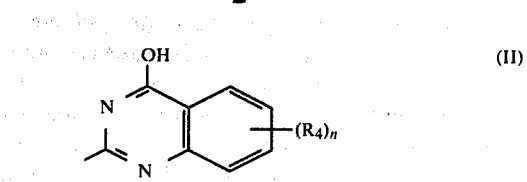

or of the formula

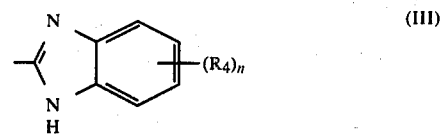

or of the formula

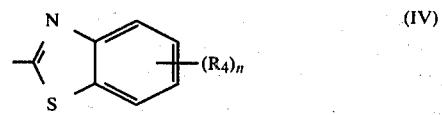

$R_3$ denotes optionally substituted aryl or hetero-aryl, cycloalkyl or $C_1-C_{12}$-alkyl, it being possible for the alkyl chain to be interrupted by oxygen or sulphur and/or substituted by hydroxyl, $-N(R_5)_2-$ or $-N(R_5)_3 \oplus X \ominus$ groups, $R_4$ denotes a substituent, $R_5$ denotes hydrogen, $C_1-C_4$-alkyl, cycloalkyl or optionally substituted aryl, X denotes an anion, m denotes 1, 2, 3 or 4 and n denotes 0, 1, 2, 3 or 4.

Examples of suitable substituents $R_4$ are halogen, such as chlorine and bromine, $C_1-C_4$-alkyl, $C_1-C_4$-alkoxy, nitro, trifluoromethyl, cyano, optionally substituted carboxamide and sulphonamide, acylamino and arylamino.

Aryl in sulphonic acid aryl ester ($R_2$) and in the meaning of $R_3$ and $R_5$ preferably denotes phenyl, which can be substituted by halogen, such as chlorine and bromine, $C_1-C_4$-alkyl, $C_1-C_4$-alkoxy, nitro, trifluoromethyl, cyano, optionally substituted carbamoyl, optionally substituted sulphamoyl, acylamino and arylamino, preferably phenylamino. These substituents are also possible for phenyl ($R_1$) as well as benzoyl ($R_2$) and benzenesulphonyl ($R_2$).

Possible substituents on the carbamoyl and sulphamoyl groups are $C_1-C_4$-alkyl, phenyl which is optionally substituted by $C_1-C_4$-alkyl, $C_1-C_4$-alkoxy, fluorine, chlorine, bromine or nitro, and benzyl. Acyl groups which are to be mentioned in particular are $C_1-C_4$-alkylcarbonylamino, and benzoylamino which is optionally substituted in the benzene nucleus by chlorine, $C_1-C_4$-alkyl, $C_1-C_4$-alkoxy or nitro. Arylamino is, in particular, phenylamino which is optionally substituted by $C_1-C_4$-alkyl, $C_1-C_4$-alkoxy, fluorine, chlorine, bromine or nitro.

Suitable amino-anthraqinones of the formula $$A-(NH_2)_m \qquad (V)$$

wherein A and m have the meaning indicated above, are: 1-amino-anthraquinone, 2-amino-anthraquinone, 1-amino-2-chloroanthraquinone, 1-amino-4-chloroanthraquinone, 1-amino-5-chloroanthraquinone, 1-amino- 6-chloroanthraquinone, a mixture of 1-amino-6- and -7-chloroanthraquinone, 1-amino-5,8-dichloroanthraquinone, 1-amino-2-bromoanthraquinone, 1-amino-2,4-dibromoanthraquinone, 1-amino-6,7-dichloroanthraquinone, 1-amino-6-fluoroanthraquinone, 1-amino-7-fluoroanthraquinone, 1-amino-6,7-difluoroanthraquinone, 2-amino-1-chloroanthraquinone, 2-amino-3-chloroanthraquinone, 2-amino-3-bromoanthraquinone, 1-amino-4-nitroanthraquinone, 1-amino-5-nitroanthraquinone, 1-amino-2-methylanthraquinone, 1-amino-2-methyl-4-chloroanthraquinone, 1-amino-2-methyl-4-bromoanthraquinone, 1-aminoanthraquinone-2-carboxylic acid, 1-aminoanthraquinone-2-carboxylic acid amide, 1-aminoanthraquinone-2-carboxylic acid methyl ester, 1-amino-4-nitroanthraquinone-2-carboxylic acid, 1-amino-2-acetylanthraquinone, 1-amino-5-benzoylaminoanthraquinone, 1-amino-4-benzoylaminoanthraquinone, 1-amino-4-hydroxyanthraquinone, 1-amino-5-hydroxyanthraquinone, 1-amino-4-methoxyanthraquinone, 1-amino-2-methoxy-4-hydroxyanthraquinone, 1-amino-4-methylaminoanthraquinone, 1-amino-4-cyclohexylaminoanthraquinone, 1-amino-4-anilinoanthraquinone, 1-amino-6-methylmercaptoanthraquinone, 2-phenyl-6-amino-4,5-phthaloylbenzimidazole, 6-chloro-2-amino-3,4-phthaloylacridone, 7-chloro-2-amino-3,4-phthaloylacridone, 5-chloro-8-amino-3,4-phthaloylacridone, 3-methyl-6-amino-anthrapyridone, 3-methyl-7-aminoanthrapyridone, 4-amino-1,9-pyrazoleanthrone, 5-amino-1,9-pyrazoleanthrone, 4-amino-1,9-anthrapyrimidine, 5-amino-1,9-anthrapyrimidine, 1,5-diaminoanthraquinone, 1,4-diaminoanthraquinone, 1,8-diaminoanthraquinone, 2,6-diaminoanthraquinone, 1,5-diamino-4-chloroanthraquinone, 1,4-diamino-5-nitroanthraquinone, 1,5-diamino-2,4,6,8-tetrabromoanthraquinone, 1,5-diamino-4,8-dihydroxyanthraquinone, 1,8-diamino-4,5-dihydroxyanthraquinone, 4,4'-diamino-1,1'-dianthrimide, 1-amino-8-benzoylaminoanthraquinone, 1-amino-2-bromo-4-(4-methylbenzenesulphonylamino)-anthraquinone, 1-amino-4-(2-chlorobenzoylamino)-anthraquinone, 1-amino-4-(3-chlorobenzoylamino)-anthraquinone, 1-amino-4-(4-chlorobenzoylamino)-anthraquinone, 1-amino-4-(2,5-dichlorobenzoylamino)-anthraquinone, 1-amino-4-(2,3,4,5-tetrachlorobenzoylamino)-anthraquinone, 1-amino-4-(3-nitrobenzoylamino)-anthraquinone, 1-amino-5-(2-chlorobenzoylamino)-anthraquinone, 1-amino-5-(3-chlorobenzoylamino)anthraquinone, 1-amino-5-(4-chlorobenzoylamino)-anthraquinone, 1-amino-5-(2,5-dichlorobenzoylamino)-anthraquinone, 1-amino-5-(2,3,4,5-tetrachlorobenzoylamino)anthraquinone, 1-amino-5-(3-nitrobenzoylamino)-anthraquinone, 1-amino-8-(2-chlorobenzoylamino)-anthraquinone, 1-amino-8-(3-chlorobenzoylamino)-anthraquinone, 1-amino-8-(4-chlorobenzoylamino)-anthraquinone, 1-amino-8-(2,5-dichlorobenzoylamino)-anthraquinone, 1-amino-8-(2,3,4,5-tetrachlorobenzoylamino)-anthraquinone and 1-amino-8-(3-nitrobenzoylamino)-anthraquinone.

Preferred anthraquinone-azomethine compounds correspond to the formula

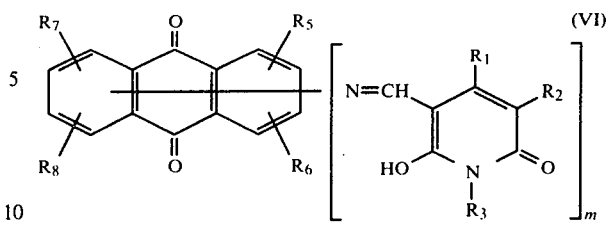

wherein $R_1$, $R_2$, $R_3$ and m have the abovementioned meaning, $R_5$ denotes hydrogen, halogen, such as fluorine, chlorine and bromine, nitro, $C_1$–$C_4$-alkyl, $C_1$–$C_4$-alkoxy, $C_1$–$C_4$-alkylamino, benzylamino, cyclohexylamino, $C_1$–$C_4$-alkylmercapto, phenylmercapto which is optionally substituted by $C_1$–$C_4$-alkyl, $C_1$–$C_4$-alkoxy, fluorine, chlorine, bromine or nitro, $C_1$–$C_4$-alkylcarbonyl, $C_1$–$C_4$-alkoxycarbonyl, phenylamino which is optionally substituted by $C_1$–$C_4$-alkyl, $C_1$–$C_4$-alkoxy, chlorine or nitro, carbamoyl which is optionally monosubstituted or disubstituted by $C_1$–$C_4$-alkyl, benzyl or phenyl, it being possible for phenyl to be substituted by $C_1$–$C_4$-alkyl, $C_1$–$C_4$-alkoxy, fluorine, chlorine, bromine or nitro, carboxyl, hydroxyl, $C_1$–$C_4$-alkylcarbonylamino, benzoylamino which is optionally substituted by $C_1$–$C_4$-alkyl, $C_1$–$C_4$-alkoxy, chlorine, bromine or nitro, or benzenesulphonylamino which is optionally substituted by $C_1$–$C_4$-alkyl, $C_1$–$C_4$-alkoxy, fluorine, chlorine, bromine or nitro, $R_6$ denotes hydrogen, chlorine, hydroxyl or methyl, $R_7$ denotes hydrogen, halogen, such as fluorine, chlorine or bromine, nitro, $C_1$–$C_4$-alkyl, $C_1$–$C_4$-alkoxy, $C_1$–$C_4$-alkylamino, $C_1$–$C_4$-alkylmercapto, phenylmercapto which is optionally substituted by $C_1$–$C_4$-alkyl, $C_1$–$C_4$-alkoxy, fluorine, chlorine, bromine or nitro, $C_1$–$C_4$-alkoxycarbonyl, $C_1$–$C_4$-alkylcarbonyl, benzylamino, cyclohexylamino, phenylamino which is optionally substituted by $C_1$–$C_4$-alkyl, $C_1$–$C_4$-alkoxy, chlorine, bromine or nitro, carboxyl, hydroxyl, carbamoyl which is optionally monosubstituted or disubstituted by $C_1$–$C_4$-alkyl, benzyl or phenyl, it being possible for phenyl to be substituted by $C_1$–$C_4$-alkyl, $C_1$–$C_4$-alkoxy, fluorine, chlorine, bromine or nitro, $C_1$–$C_4$-alkylcarbonylamino, benzoylamino which is optionally substituted by $C_1$–$C_4$-alkyl, $C_1$–$C_4$-alkoxy, chlorine, bromine or nitro, $C_1$–$C_4$-alkanesulphonylamino, or benzenesulphonylamino which is optionally substituted by $C_1$–$C_4$-alkyl, $C_1$–$C_4$-alkoxy, fluorine, chlorine, bromine or nitro and $R_8$ denotes hydrogen, halogen, such as fluorine, chlorine and bromine, or hydroxyl.

Anthraquinone-azomethine compounds of the formula

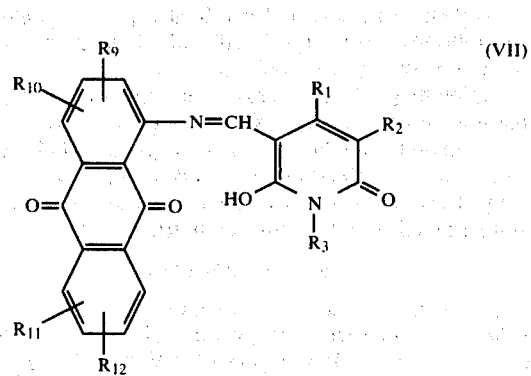
(VII)

wherein
$R_1$, $R_2$ and $R_3$ have the abovementioned meaning and $R_9$, $R_{10}$, $R_{11}$ and $R_{12}$ denote hydrogen, chlorine, bromine, carboxyl, $C_1$-$C_4$-alkoxycarbonyl, carbamoyl, $C_1$-$C_4$-alkylcarbonylamino, benzoylamino which is optionally substituted by 1 or 2 nitro groups or 1 to 5 chlorine or bromine atoms, $C_1$-$C_4$-alkylsulphonylamino, benzenesulphonylamino which is optionally substituted by methyl, methoxy or chlorine, or a radical of the formula

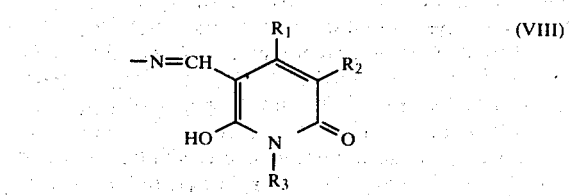
(VIII)

are particularly preferred.

The preparation of the anthraquinone-azomethine compounds (I) from the amino-anthraquinones of the formula

A–(NH$_2$)$_m$ (V)

and the 6-hydroxy-2-pyridones, appropriately substituted in the 1-, 3- and 4-position, of the formula

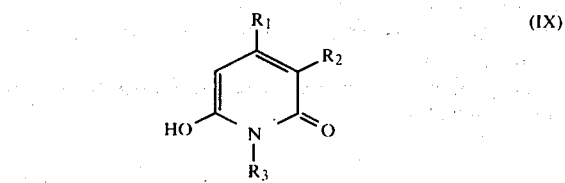
(IX)

in which $R_1$, $R_2$ and $R_3$ have the abovementioned meaning, can be carried out by several processes.

(1) The 6-hydroxy-2-pyridones of the formula (IX), which are appropriately substituted in the 1-, 3- and 4-position, are subjected to a condensation reaction with an orthoformic acid trialkyl ester of the formula

HC(OR)$_3$ (X)

in which R preferably represents a $C_1$-$C_4$-alkyl group, at 100°–220° C. in an organic solvent which is inert towards the reactants, and the resulting 5-alkoxymethylene-2,6-pyridones, appropriately substituted in the 1-, 3- and 4-position, of the formula

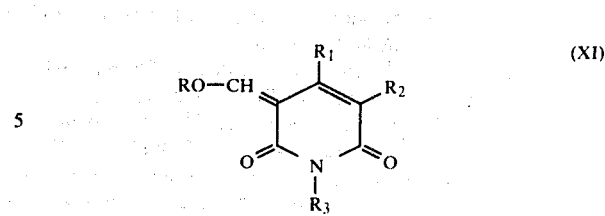
(XI)

in which $R_1$, $R_2$ and $R_3$ have the abovementioned meaning, are then reacted with an amino-anthraquinone of the formula

A–(NH$_2$)$_m$ (V)

at 100°–220° C., preferably 120°–180° C., in the same reaction medium or in another organic reaction medium.

(2) The amino-anthraquinones of the formula

A–(NH$_2$)$_m$ (V)

are subjected to a condensation reaction with an orthoformic acid trialkyl ester of the abovementioned formula (X) at 100°–220° C., preferably 120°–180° C., in an organic solvent which is inert towards the reactants, and the resulting formimino-esters of the formula

A–(N=CH–OR)$_m$ (XII)

in which R preferably represents a $C_1$-$C_4$-alkyl group, are then reacted with 6-hydroxy-2-pyridones of the abovementioned formula (IX), which are appropriately substituted in the 1-, 3- and 4-position, at 100°–220° C., preferably 120°–180° C., in the same reaction medium or in another organic reaction medium.

Suitable organic solvents for processes (1) and (2) are aromatic and hetero-aromatic compounds, such as toluene, chlorobenzene, pyridine, o-dichlorobenzene, 1,2,4-trichlorobenzene or nitrobenzene, alcohols, such as butanol or diethylene glycol monomethyl ether, ethers, such as ethylene glycol dimethyl ether or ethylene glycol diethyl ether, or dipolar aprotic solvents, such as dimethylformamide, dimethylacetamide, N-methylpyrrolidone, tetramethylurea, dimethylsulphoxide or tetramethylene sulphone.

(3) In another process, the amino-anthraquinones of the formula

A–(NH$_2$)$_m$ (V)

are converted into the corresponding formamidinium halides of the formula

A–(NH–CH N$^{\oplus}$(R)$_2$]$_m$ X$^{\ominus}$ (XIII)

wherein
R preferably represents a $C_1$-$C_4$-alkyl group and
X represents chlorine or bromine,
with a dialkylformamide and a thionyl halide, in particular thionyl chloride, at 40°–100° C., preferably 40°–80° C., in an organic solvent which is inert towards the reactants, and the resulting formamidinium halides (XIII) are subjected to a condensation reaction with 6-hydroxy-2-pyridones of the abovementioned formula (IX), which are appropriately substituted in the 1-, 3- and 4-position, at 100°–220° C., preferably 120°–180° C., in the same solvent or in another organic solvent, and in the presence of an acid-binding agent.

Organic solvents which are particularly suitable for process (3) are aromatic hydrocarbons, such as toluene, chlorobenzene, o-dichlorobenzene, 1,2,4-trichlorobenzene or nitrobenzene, ethers, such as ethylene glycol dimethyl ether or ethylene glycol diethyl ether, or dipolar aprotic solvents, such as dimethylformamide, diethylformamide, N-methylpyrrolidone, dimethylsulphoxide or tetramethylene sulphone.

The dialkylformamides used are preferably lower dialkylformamides, such as dimethylformamide or diethylformamide, but it is also possible to employ cyclic alkyl-carboxylic acid amides, such as N-methylpyrrolidone.

Acid-binding agents used in process (3) are alkali metal hydroxides or carbonates or alkaline earth metal hydroxides or carbonates, or alkali metal salts or alkaline earth metal salts of aliphatic carboxylic acids, preferably sodium carbonate, bicarbonate or acetate or potassium carbonate, bicarbonate or acetate.

The new anthraquinone-axomethine compounds are suitable for pigmenting and dyeing organic macromolecular substances.

The compounds of the formula (I) are obtained in a suitable form for use as pigments, or they can be converted into a suitable form by after-treatment processes which are known per se, for example by dissolving or swelling in strong inorganic acids, such as sulphuric acid, and discharging the mixture onto ice. Fine division can also be achieved by grinding, with or without grinding auxiliaries, such as inorganic salts or sand, and if appropriate in the presence of solvents, such as toluene, xylene, dichlorobenzene or N-methylpyrrolidone. The tinctorial strength and transparency of the pigment can be influenced by varying the after-treatment.

Depending on their substituents, the anthraquinone-azomethine compounds of the formula (I) are suitable for use as dyestuffs for synthetic fibres, such as polyester, polyamide and polyacrylonitrile fibres, and also, because of their fastness to light and migration, for use as pigments for the most diverse pigment applications. The pigments can be used for pigmented systems which are very fast, such as mixtures with other substances, formulations, paints, printing pastes, coloured paper and coloured macromolecular substances. Mixtures with other substances can be understood, for example, as those with inorganic white pigments, such as titanium dioxide (rutile), or with cement. Formulations are, for example, flush pastes with organic liquids or pastes and fine pastes with water, dispersing agents and, if appropriate, preservatives. The term paints means, for example, lacquers which dry physically or by oxidation, stoving lacquers, reactive lacquers, two-component lacquers, emulsion paints for weather-resistant coatings and distempers. Printing pastes are to be understood as those for paper printing, textile printing and tin plate printing. The macromolecular substances can be of natural origin, such as rubber, or they can be obtained by chemical modification, such as acetylcellulose, cellulose butyrate or viscose, or synthetically produced, such as polymers, polyaddition products and polycondensates. In this context, there may be mentioned plastic compositions like polyvinylchloride, chloride, polyvinyl acetate and polyvinyl propionate, polyolefines, for example polyethylene, or polyamides, high-molecular weight polyamides, polymers and copolymers of acrylates, methacrylates, acrylonitrile, acrylamide, butadiene and styrene, and polyurethanes and polycarbonates. The substances pigmented with the claimed products can be in any desired form.

The pigments I according to the invention are furthermore outstandingly fast to water, oil, acid, lime, alkali, solvents, overlacquering, overspraying and sublimation, outstandingly stable to heat and vulcanisation and of very high tinctorial strength and they can easily be distributed in plastic compositions.

EXAMPLE 1

(a) 11 g of 97% pure 1-amino-anthraquinone, 8.5 g of orthoformic acid triethyl ester and 120 g of nitrobenzene are stirred at 140°–145° C. for about 3 hours, the ethanol formed being distilled over a bridge and the formation of the formimino-ester of the formula

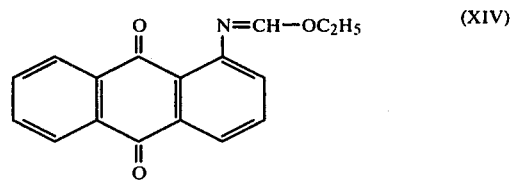

being followed by thin layer chromatography. When the 1-amino-anthraquinone has disappeared, 8.1 g of 1-methyl-3-cyano-4-methyl-6-hydroxy-2-pyridone are added to the reaction mixture and the mixture is heated to 145°–150° C. for a further 2–3 hours. Thereafter, it is allowed to cool to 100° C. and the pigment, which has crystallised out in fine yellow needles, is filtered off, washed with hot nitrobenzene and methanol and dried at 100° C. 17.9 g (94.2% of theory) of the reddish-tinged yellow pigment of the formula

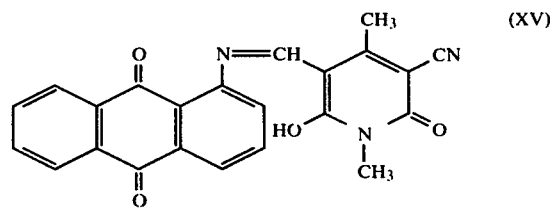

are thus obtained.

Calculated: C 69.52; H 3.78; N 10.58. Found: C 69.8; H 3.6; N 10.65.

The pigment can also exist in the following tautomeric structures:

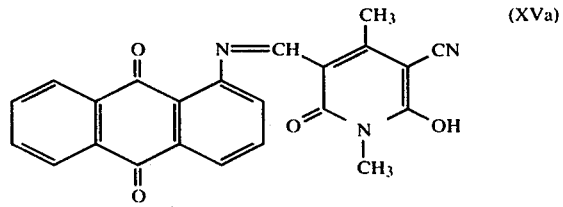

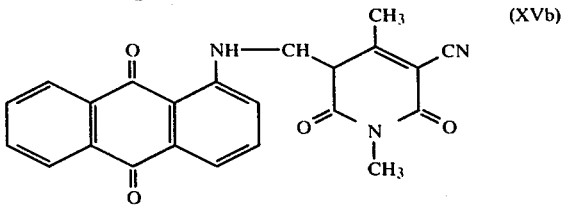

(b) 7.3 g of thionyl chloride are added to 11 g of 97% pure 1-amino-anthraquinone, 4 g of dimethylformamide and 90 g of nitrobenzene at 50°–60° C. in the course of 1 hour and the mixture is stirred for about a further hour, until the formamidinium chloride of the formula

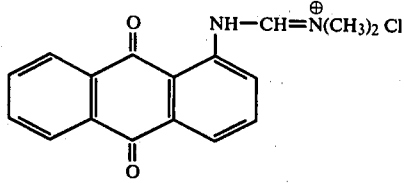

has formed. The reaction mixture is subsequently stirred in vacuo for a further hour to remove the excess thionyl chloride, 8.1 g of 1-methyl-3-cyano-4-methyl-6-hydroxy-2-pyridone and 12.5 g of anhydrous sodium acetate are then added successively and the mixture is heated to 150°–160° C. in the course of about 1 hour. It is stirred at 150°–160° C. until formation of the pigment, which crystallises in yellow-red prisms, is complete, the pigment is then filtered off at 100° C. and washed with hot nitrobenzene and with methanol and water, and, after drying, 16.4 g (86.3% of theory) of the reddish-tinged yellow pigment, which is identical to that from Example 1a, are obtained.

Using the 6-hydroxy-2-pyridones, appropriately substituted in the 1-, 3- and 4-position, of the formula (IX)

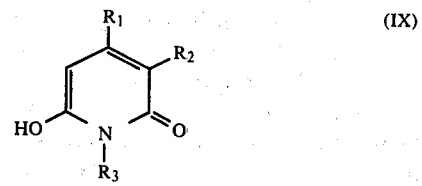

which are listed in the following Table 1, and 1-aminoanthraquinone, anthraquinone pigments which have yellow colour shades and correspond to the formula (XV) are obtained by the processes described in Example 1a or 1b:

TABLE 1

| Example | $R_1$ | $R_2$ | $R_3$ |
|---|---|---|---|
| 2 | H | CN | $CH_3$ |
| 3 | $C_2H_5$ | CN | $CH_2-CH_2-OH$ |
| 4 | i-$C_3H_7$ | CN | $CH_3$ |
| 5 | n-$C_4H_9$ | CN | $CH_3$ |
| 6 | $CH_3$ | $COCH_3$ | $CH_3$ |
| 7 | $CH_2-CH_2-OH$ | CN | $C_2H_5$ |
| 8 | COOH | H | $CH_3$ |
| 9 | $COOCH_3$ | H | $CH_3$ |
| 10 | OH | CN | $CH_3$ |
| 11 | p-$C_6H_4-Cl$ | CN | $CH_3$ |
| 12 | OH | H | $CH_3$ |
| 13 | $CH_3$ | CN | $-(CH_2)_{11}-CH_3$ |
| 14 | $CH_3$ | $COOC_2H_5$ | $CH_3$ |
| 15 | $CH_3$ | Br | $CH_3$ |
| 16 | $CH_3$ | $NO_2$ | $CH_3$ |
| 17 | $CH_3$ | $CO-N(CH_3)_2$ | $CH_3$ |
| 18 | $CH_3$ | $SO_2-N(CH_3)_2$ | $CH_3$ |
| 19 | $CH_3$ | $-SO_2-OCH_3$ | $C_2H_5$ |
| 20 | $CH_3$ | $-SO_2-O-\langle\phantom{x}\rangle-Cl$ | $CH_3$ |
| 21 | $CH_3$ | $-CO-O-\langle\phantom{x}\rangle$ (Cl, Cl) | n-$C_3H_7$ |
| 22 | $CH_3$ | $-COO-CH_2-CH_2-OCH_3$ | $CH_3$ |
| 23 | $C_2H_5$ | $-SO_2-CH_3$ | $CH_3$ |
| 24 | $CH_3$ | $-SO_2-\langle\phantom{x}\rangle$ | n-$C_4H_9$ |
| 25 | $CH_3$ | $-SO_2-\langle\phantom{x}\rangle-OCH_3$ | $CH_3$ |
| 26 | $CH_3$ | benzimidazolyl (NH) | $CH_3$ |
| 27 | $CH_3$ | benzothiazolyl | $CH_3$ |

Pigments with excellent fastness properties and similar colour shades are obtained if the following 1-aminoanthraquinone derivatives are employed in Examples 1–27 instead of the 1-amino-anthraquinone used in those Examples: 1-amino-4-chloro-anthraquinone, 1-amino-5-chloro-anthraquinone, a mixture of 1-amino-6-and -7-chloro-anthraquinone, 1-amino-6,7-dichloroanthraquinone, 1-amino-2,4-dibromo-anthraquinone, 1-amino-6-fluoro-anthraquinone, 1-amino-4-nitro-anthraquinone, 1-amino-5-nitro-anthraquinone, 1-amino-anthraquinone-2-carboxylic acid amide and 1-amino-2-acetylanthraquinone.

EXAMPLE 28

8.5 g of 87% pure 1-amino-5-benzoylamino-anthraquinone and 3 g of orthoformic acid trimethyl ester in 75 g of nitrobenzene are heated to 140°–150° C. for about 2–3 hours, the methanol formed being distilled off over a short bridge. When the starting material has disappeared, 6 g of 1-p-tolyl-3-cyano-4-methyl-6-hydroxy-2-pyridone are introduced and the mixture is heated to 145°–150° C. for a further 4 hours. After cooling to 100° C., the pigment, which has crystallised in red prisms, is filtered off and washed with hot nitrobenzene and methanol, and, after drying at 100° C., 11.9 g (93% of theory) of the red pigment of the formula

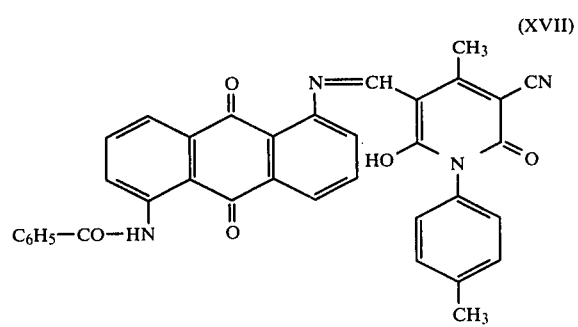

(XVII)

are obtained.

Calculated: C 72.97; H 4.05; N 9.46. Found: C 72.62; H 3.95; N 9.41.

The pigment is obtained with similar yields if the following solvents are used instead of the nitrobenzene: o-dichlorobenzene, 1,2,4-trichlorobenzene, diethylene glycol monoethyl ether, diethylene glycol dimethyl ether, dimethylformamide, N-methylpyrrolidone, dimethylsulphoxide and tetramethylene sulphone.

Using the 1-aryl- or 1-hetero-aryl-6-hydroxy-2-pyridones, appropriately substituted in the 3- and 4-position, of the formula (IX)

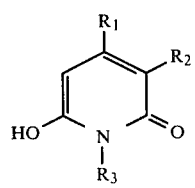

(IX)

which are listed in the following Table 2, and 1-amino-5-benzoylamino-anthraquinone, corresponding anthraquinone pigments with red colour shades are obtained:

TABLE 2

| Example | R₁ | R₂ | R₃ |
|---|---|---|---|
| 29 | $CH_3$ | CN | –⟨phenyl⟩ |
| 30 | $CH_3$ | $CO-CH_3$ | –⟨phenyl⟩–Cl |
| 31 | $CH_3$ | CN | –⟨phenyl⟩–Br |
| 32 | $COOCH_3$ | CN | –⟨phenyl⟩ with Cl, Cl |
| 33 | $CH_3$ | $SO_2-CH_3$ | –⟨phenyl⟩–CN |
| 34 | $CH_3$ | CN | –⟨phenyl⟩–$NO_2$ |
| 35 | $CH_3$ | CN | –⟨phenyl⟩–$NH-CO-CH_3$ |
| 36 | $C_2H_5$ | $CO-C_2H_5$ | –⟨phenyl⟩–$CON(CH_3)_2$ |
| 37 | $CH_3$ | CN | –⟨phenyl⟩–$SO_2N(CH_3)_2$ |
| 38 | $CH_3$ | $CO-CH_3$ | –⟨phenyl⟩–$CF_3$ |
| 39 | $CH_3$ | CN | –⟨pyridyl⟩ |
| 40 | $CH_3$ | CN | –⟨benzimidazolyl⟩ |

EXAMPLE 41

8.5 g of 95% pure 1-amino-4-benzoylamino-anthraquinone and 4.4 g of orthoformic acid triethyl ester in 100 g of o-dichlorobenzene are heated to 140°–150° C. for about 2–3 hours, the ethanol formed being distilled off over a short bridge. When the starting material has disappeared, 4.7 g of 1-methyl-3-cyano-4-methyl-6-hydroxy-2-pyridone are introduced and the mixture is heated to 140°–150° C. for a further 4 hours. After cooling to 100° C., the pigment, which has crystallised in attractive red prisms, is filtered off and washed with hot o-dichlorobenzene and methanol, and, after drying at 100° C., 14 g (94.7% of theory) of the bluish-tinged red pigment of the formula

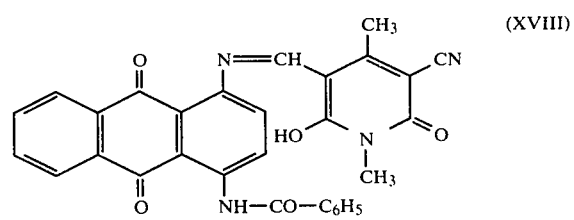

(XVIII)

are obtained:

Calculated: C 69.77; H 3.88; N 10.85. Found: C 69.80; H 3.9; N 11.0.

Pigments with excellent properties and similar colour shades are obtained if 1-amino-4-(4-chlorobenzoylamino)-anthraquinone, 1-amino-4-(2,4-dichlorobenzoylamino)-anthraquinone, 1-amino-4-(3-nitrobenzoylamino)-anthraquinone or 1-amino-4-(4-acetylaminobenzoylamino)-anthraquinone is used instead of the abovementioned 1-amino-4-benzoylamino-anthraquinone.

EXAMPLE 42

11.8 g of 1-amino-4-hydroxy-anthraquinone and 8.5 g of orthoformic acid triethyl ester in 120 g of nitrobenzene are stirred at 140°–145° C. for about 3 hours, the ethanol formed being distilled off over a bridge. When the starting material has disappeared, 9.6 g of 1-(2-hydroxyethyl)-3-cyano-4-methyl-6-hydroxy-2-pyridone are introduced and the mixture is heated to 140°–150° C. for a further 4 hours. After cooling to 100° C., the pigment, which has crystallised in attractive dark-red needles, is filtered off and washed with hot nitrobenzene and methanol, and, after drying at 100° C., 19.9 g (91% of theory) of the brown-red pigment of the formula

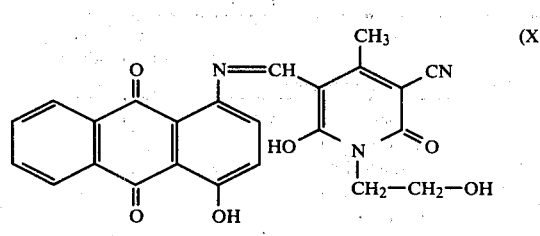

are obtained.
Calculated: C 65.01; H 3.84; N 9.48. Found: C 65.0; H 3.80; N 9.50.

EXAMPLE 43

5.5 g of 1,5-diamino-anthraquinone and 8.8 g of orthoformic acid triethyl ester in 80 g of nitrobenzene are heated to 145°–150° C. for about 3 hours, the ethanol formed being distilled off over a bridge and the disappearance of the starting material being followed by thin layer chromatography. 7.6 g of 1-methyl-3-cyano-4-methyl-6-hydroxy-2-pyridone are now added and the mixture is heated to 140°–150° C. until formation of the pigment has ended, which takes about 4 hours. The pigment, which has crystallised in orange-yellow prisms, is then filtered off at 120° C. and washed with hot nitrobenzene and methanol, and, after drying at 100° C., 13.2 g (97% of theory) of the orange-coloured pigment of the formula

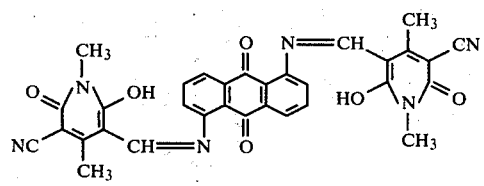

are obtained.
Calculated: C 65.53; H 3.75; N 14.33. Found: C 65.55; H 3.80; N 14.13.

If 5.5 g of 1,8-diamino-anthraquinone are used in Example 43 instead of the abovementioned 1,5-diamino-anthraquinone, 13.3 g (98.2% of theory) of the reddish-tinged orange-coloured pigment of the formula

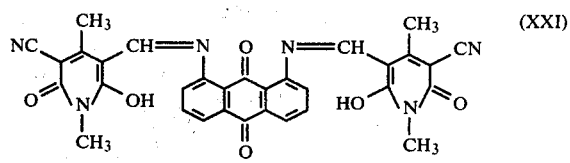

are obtained.
Calculated: C 65.53; H 3.75; N 14.33. Found: C 65.42; H 3.62; N 14.41.

If 5.5 g of 1,4-diamino-anthraquinone are employed in Example 43 instead of the abovementioned 1,5-diamino-anthraquinone, 13.3 g (98.2% of theory) of the dark brown pigment of the formula

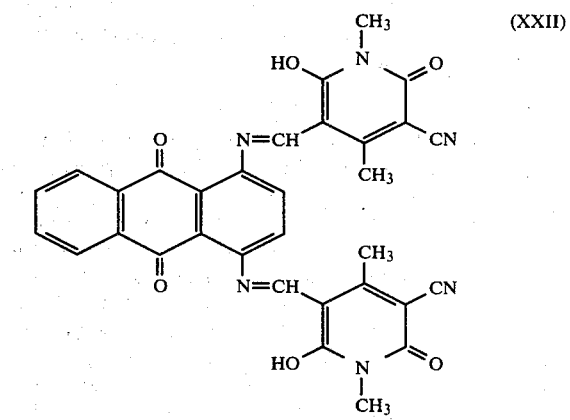

are obtained.
Calculated: C 65.53; H 3.75; N 14.33. Found: C 65.40; H 3.60; N 14.30.

EXAMPLE 44

5 g of 1,5-diamino-4,8-dihydroxy-anthraquinone and 4.4 g of orthoformic acid trimethyl ester in 75 g of nitrobenzene are heated to 145°–150° C. for about 3 hours, the methanol formed being distilled off over a bridge and the disappearance of the starting material being followed by thin layer chromatography. 8.1 g of 1-methyl-3-cyano-4-methyl-6-hydroxy-2-pyridone are now added and the mixture is heated to 160°–170° C. until the formation of pigment has ended. The pigment, which has crystallised in attractive green-black needles, is then filtered off at 120° C. and washed with hot nitrobenzene and methanol, and, after drying at 100° C., 10.5 g (91.8% of theory) of the blue-black pigment of the formula

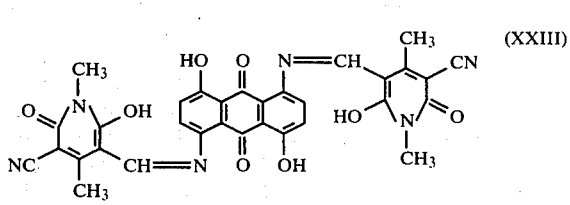

are obtained.
Calculated: C 62.34; H 3.57; N 13.64. Found: C 62.23; H 3.60; N 13.50.

If 5 g of 1,8-diamino-4,5-dihydroxy-anthraquinone is used in Example 44 instead of the 1,5-diamino-4,8-dihydroxy-anthraquinone, 10.75 g (94% of theory) of the blue-black pigment of the formula

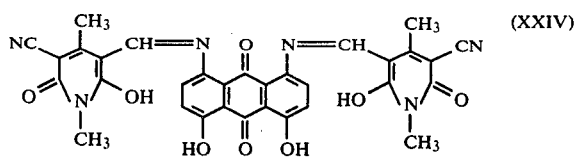

are obtained.

Calculated: C 62.34; H 3.57; N 13.64. Found: C 62.21; H 3.60; N 13.51.

Pigments with excellent properties and similar colour shades are obtained if 1,5-diamino-4,8-dihydroxy-x-bromo-anthraquinone or 1,8-diamino-4,8-dihydroxy-x-bromo-anthraquinone is employed in Example 44 instead of the 1,5-diamino-4,8-dihydroxy-anthraquinone used in that Example.

EXAMPLE 45

3.4 g of 1,4,5,8-tetraamino-anthraquinone and 9 g of orthoformic acid triethyl ester in 125 g of nitrobenzene are heated to 145°–150° C. for 3–4 hours, the enthanol formed being distilled off over a bridge and the disappearance of the starting material being followed by thin layer chromatography. 8.4 g of 1-methyl-3-cyano-4-methyl-6-hydroxy-2-pyridone are now added and the mixture is heated to 175°–180° C. until formation of the pigment, in blué-black prisms, is complete. The pigment is then filtered off at 120° C. and washed with hot nitrobenzene and methanol, and, after drying at 100° C., 11.1 g (90.8% of theory) of the bluish-tinged grey pigment of the formula

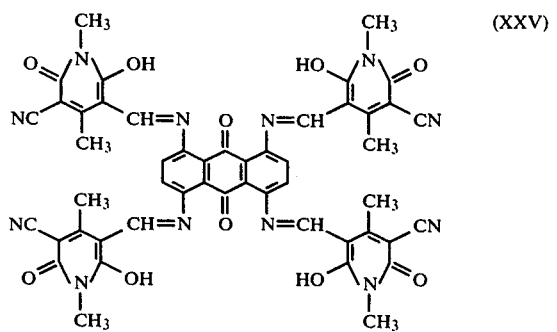

are obtained.
Calculated: N 17.43. Found: N 17.21.

EXAMPLE 46

13.37 g of 1-amino-4,5,8-trihydroxy-anthraquinone and 8.8 g of orthoformic acid triethyl ester in 80 g of nitrobenzene are heated to 145°–150° C. for about 3 hours, the ethanol formed being distilled off over a bridge and the disappearance of the starting material being followed by thin layer chromatography. 8.7 g of 1-methyl-3-cyano-4-methyl-6-hydroxy-2-pyridone are now added and the mixture is heated to 155°–160° C. until formation of the pigment is complete. After cooling to 110° C., the pigment, which has crystallised in yellow-brown prisms, is filtered off and washed with hot nitrobenzene and methanol, and, after drying at 100° C., 19.6 g (89.3% of theory) of the brown pigment of the formula

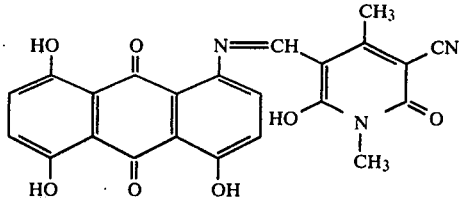

are obtained.
Calculated: N 9.44. Found: N 9.35.

If equivalent amounts of the amino-anthraquinones listed in Table 3 are used in Example 46 instead of 1-amino-4,5,8-trihydroxy-anthraquinone corresponding pigments with the colour shades indicated in the Table are obtained.

TABLE 3

| Example | Amino-anthraquinone | Colour shade of the resulting pigment |
| --- | --- | --- |
| 47 | 1-Amino-4,8-dihydroxy-anthraquinone | violet |
| 48 | 1-Amino-2-bromo-4-hydroxy-anthraquinone | red |
| 49 | 1-Amino-4-anilino-anthraquinone | reddish-tinged grey |

EXAMPLE 50

5.5 g of 97% pure 1-amino-anthraquinone and 3 g of orthoformic acid trimethyl ester in 60 g of nitrobenzene are heated to 145°–150° C. for about 3 hours, the methanol formed being distilled off over a bridge and the disappearance of the starting material being followed by thin layer chromatography. 6 g of 1-p-tolyl-3-cyano-4-methyl-6-hydroxy-2-pyridone are now added and the mixture is heated to 145°–150° C. until formation of the pigment is complete. After cooling, the product, which has crystallised in attractive yellow long prisms, is filtered off and washed with nitrobenzene and methanol, and, after drying, 11.3 g (96.9% of theory) of the yellow pigment of the formula

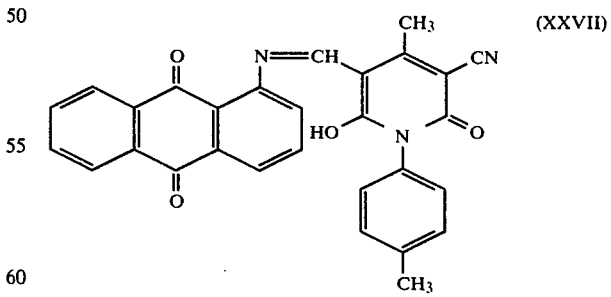

are obtained.
Calculated: C 73.57; H 4.02; N 8.88. Found: C 73.41; H 3.90; N 8.71.

If 8.5 g of 1-amino-4-benzoylamino-anthraquinone are used instead of the abovementioned 1-amino-anthraquinone, 13.4 g of the pigment of the formula

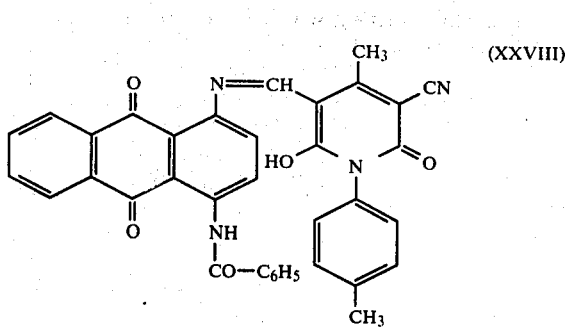

which has crystallised in attractive red-orange coloured needles, are obtained.

Calculated: C 72.97; H 4.05; N 9.46. Found: C 72.78; H 4.1; N 9.58.

If 5 g of 1,5-diamino-anthraquinone in 75 g of nitrobenzene are reacted with 5 g of orthoformic acid trimethyl ester and the product is then reacted with 10.1 g of 1-p-tolyl-3-cyano-4-methyl-6-hydroxy-2-pyridone according to Example 50, 14.6 g (94.2% of theory) of the pigment of the formula

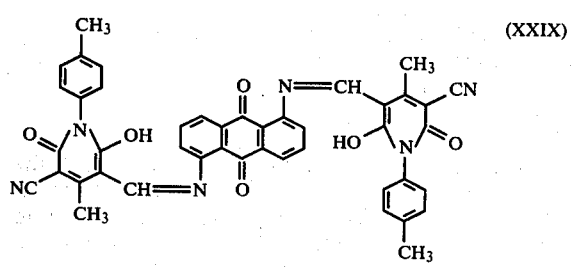

which has crystallised in orange-coloured prisms, are obtained.

Calculated: C 71.54; H 4.07; N 11.38. Found: C 71.41; H 3.95; N 11.42.

EXAMPLE 51

11 g of 1-amino-anthraquinone and 5.8 g of orthoformic acid trimethyl ester in 75 g of ortho-dichlorobenzene are heated to 145°–150° C. for about 3 hours, the methanol formed being distilled over a bridge. When the starting material has disappeared, 11.8 g of 1-(3-ethoxy-propyl)-3-cyano-4-methyl-6-hydroxy-2-pyridone are added and the mixture is heated to 145°–150° C. until formation of the dyestuff has ended. After cooling, the dyestuff, which has crystallised in attractive yellow matted needles, is filtered off and washed with orthodichlorobenzene and methanol, and, after drying, 19.8 g (85.6% of theory) of the orange-coloured dyestuff of the formula

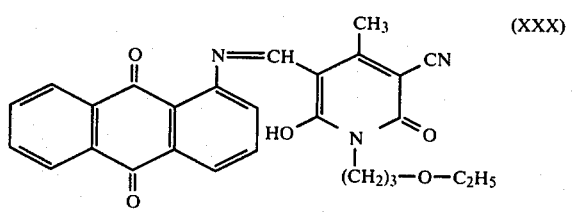

are obtained.

Calculated: C 69.08; H 4.9; N 8.69. Found: C 69.0; H 4.8; N 8.78.

The dyestuff dyes polyester fibres, by the known exhaustion or thermosol processes, in brilliant shades which are yellow-orange in colour and have excellent fastness to washing, heat-setting and light.

If the pyridone used in Example 51 is replaced by 11.75 g of 1-(3-dimethylamino-propyl)-3-cyano-4-methyl-6-hydroxy-2-pyridone, the dyestuff of the formula

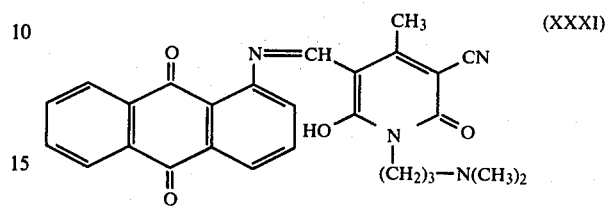

is obtained. If this dyestuff is quaternised with dimethylsulphate in chlorobenzene in the known manner, the dyestuff of the formula

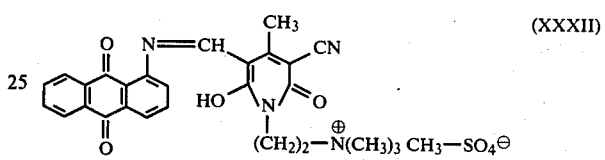

which dyes polyacrylonitrile fibres in brilliant reddish-tinged yellow colour shades by the customary dyeing processes is obtained.

EXAMPLE 52

12.6 g of 5-amino-1,9-isothiazolanthrone and 5.8 g of orthoformic acid trimethyl ester in 75 g of nitrobenzene are heated to 145°–150° C. for about 3 hours, the methanol formed being distilled off over a bridge. When the starting material has disappeared, 8.2 g of 1-methyl-3-cyano-4-methyl-6-hydroxy-2-pyridone are added and the mixture is heated to 145°–150° C. until formation of the pigment is complete. After cooling, the pigment, which has crystallised in yellow prisms, is filtered off at 100° C. and washed with nitrobenzene and methanol, and, after drying, 19.4 g (91.1% of theory) of the pigment of the formula

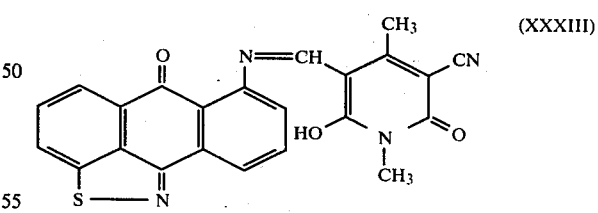

are obtained.

Calculated: C 64.79; H 3.29; N 13.15; S 7.51. Found: C 64.68; H 3.2; N 13.08; S 7.43.

Similar yellow pigments are obtained if equivalent amounts of 4-amino- or 5-amino-1,9-pyrazolanthrone are employed instead of the abovementioned 5-amino-1,9-isothiazolanthrone.

EXAMPLE 53

(a) 8 g of the finely divided pigment obtained according to Example 1a are ground on an automatic Hoover-Muller grinder with a stoving lacquer consisting of 25 g of coconut oil alkyd resin (40% of coconut oil), 10 g of melamine resin, 50 g of toluene and 7 g of glycol monomethyl ether. The mixture is applied to the substrate to be lacquered and the lacquer is hardened by stoving at 130° C. to give reddish-tinged yellow lacquerings with very good fastness to over-lacquering and outstanding fastness to light and weathering.

Pigmented stoving lacquers with the same fastness properties are obtained if 15–25 g of the alkyd resin indicated or of an alkyd resin based on cottonseed oil, dehydrated castor oil, castor oil or synthetic fatty acids are used, and 10–15 g of the melamine resin mentioned or of a condensation product of formaldehyde with urea or with benzoguanamine are used instead of the amount of melamine resin indicated.

(b) If 1 to 10 g of a mixture of titanium dioxide (rutile type) with the pigment indicated in Example 53a in the ratio 0.5–50:1 are ground into the lacquer described in Example 53a instead of the amount of pigment indicated, the same further processing gives lacquerings with the same fastness properties and with a reddish-tinged yellow colour shade which shifts towards white with an increasing content of titanium dioxide.

EXAMPLE 54

6 g of finely divided pigment according to Example 1a are ground into 100 g of a nitrocellulose lacquer consisting of 44 g of collodion cotton (low-viscosity, 35% strength, butanol-moist), 5 g of dibutyl phthalate, 40 g of ethyl acetate, 20 g of toluene, 4 g of n-butanol and 10 g of glycol monomethyl ether. After brushing the lacquer onto a substrate and drying, reddish-tinged yellow lacquerings of outstanding fastness to light and over-lacquerings are obtained. The same results are obtained using nitrocellulose lacquers which have a nitrocellulose content of 10–15 g and a plasticiser content of 5–10 g and contain 70–85 g of a solvent mixture, aliphatic esters, such as ethyl acetate and butyl acetate, and aromatics, such as toluene and xylene, and relatively small proportions of aliphatic ethers, such as glycol ether, and alcohols, such as butanol, preferably being used. By plasticisers there may be understood, for example: phthalates, such as dioctyl phthalate and dibutyl phthalate, esters of phosphoric acid and castor oil, by itself or in combination with oil-modified alkyd resins.

Lacquerings with similar fastness properties are obtained using other spirit lacquers, Zapon lacquers and nitrocellulose lacquers which dry physically, air-drying oil varnishes, synthetic resin lacquers and nitrocellulose combination lacquers, and oven-drying and air-drying epoxide resin lacquers, if appropriate in combination with urea resins, melamine resins, alkyd resins or phenolic resins.

EXAMPLE 55

5 g of finely divided pigment according to Example 1a are ground in a porcelain ball mill with 100 g of an unsaturated polyester resin which dries without paraffin. 10 g of styrene, 59 g of melamine/formaldehyde resin and 1 g of a paste consisting of 40% of cyclohexanone peroxide and 60% of dibutyl phthalate are stirred thoroughly with the ground material, and finally 4 g of dryer solution (10% strength cobalt naphthenate in white spirit) and 1 g of silicone oil solution (1% strength in xylene) are admixed. The mixture is applied to primed wood and a high-gloss, water-resistant reddish-tinged yellow lacquering which is fast to weathering and has outstanding fastness to light is obtained.

If amine-hardening epoxide resin lacquers with dipropylenediamine as the amine component are used instead of the reactive lacquer based on unsaturated polyester resins, reddish-tinged yellow lacquerings of outstanding fastness to weathering and efflorescence are obtained.

EXAMPLE 56

100 g of a 65% strength solution of an aliphatic polyester, with about 8% of free hydroxyl groups, in glycol monomethyl ether-acetate are ground with 5 g of the pigment obtained according to Example 1a and the ground material is then mixed thoroughly with 44 g of a 67% strength solution of the reaction product of 1 mol of trimethylolpropane and 3 mols of toluylene diisocyanate. Without impairment of the pot life, after application of the mixture and reaction of the components, high-gloss reddish-tinged yellow polyurethane lacquerings of outstanding fastness to efflorescence, light and weathering result.

Pigmentations of similar fastness are obtained using other two-component lacquers based on aromatic or aliphatic isocyanates and polyethers or polyesters containing hydroxyl groups, and with polyisocyanate lacquers which dry in the presence of moisture and give polyurea lacquerings.

EXAMPLE 57

5 g of a fine paste obtained by kneading 50 g of the pigment obtained according to Example 1a with 15 g of an aryl polyglycol ether emulsfier and 35 g of water are mixed with 10 g of baryte, as the filler, 10 g of titanium dioxide (rutile type) as a white pigment, and 40 g of an aqueous emulsion paint containing about 50% of polyvinyl acetate. The paint is brushed onto the substrate and, after drying, reddish-tinged yellow paint films of very good fastness to lime and cement and outstanding fastness to weathering and light are obtained.

The fine paste obtained by kneading is likewise suitable for pigmenting clear polyvinyl acetate emulsion paints, and for emulsion paints which contain copolymers of styrene and maleic acids as binders and emulsion paints based on polyvinyl propionate, polymethacrylate or butadiene/styrene.

EXAMPLE 58

10 g of the pigment paste mentioned in Example 57 are mixed with a mixture of 5 g of chalk and 5 g of 20% strength size solution. A reddish-tinged yellow wallpaper paint is obtained with which coatings of outstanding fastness to light are achieved. To prepare the pigment paste, it is also possible to use other nonionic emulsifiers, such as the reaction products of nonylphenol and ethylene oxide, or ionic wetting agents, such as the sodium salts of alkylarylsulphonic acids, for example of dinaphthylmethanedisulphonic acid. sodium salts of substituted sulphonic acid esters and sodium salts of paraffinsulphonic acids, in combination with alkyl polyglycol ethers.

EXAMPLE 59

A mixture of 65 g of polyvinyl chloride, 35 g of diisooctyl phthalate, 2 g of dibutyl-tin mercaptide, 0.5 g of titanium dioxide and 0.5 g of the pigment of Example 1a is compounded on a mixing mill at 165° C. An intensely reddish-tinged yellow-coloured mass which can be used for producing films or shaped articles is obtained. The coloration is distinguished by outstanding fastness to light and very good fastness to plasticisers.

EXAMPLE 60

0.2 g of the pigment according to Example 1a is mixed with 100 g of polyethylene granules, polypropylene granules or polystyrene granules. The mixture can be either injection-moulded directly in an injection-moulding machine at 220° to 280° C., or processed to coloured rods in an extruder or to coloured hides on a mixing mill. If appropriate, the rods and hides are granulated and the granules injection-moulded in an injection-moulding machine.

The reddish-tinged yellow moulded articles have very good fastness to light and migration. Synthetic polyamides of caprolactam or adipic acid and hexamethylenediamine, or the condensation products of terephthalic acid and ethylene glycol can be coloured in a similar manner at 280°–300° C., if appropriate under a nitrogen atmosphere.

EXAMPLE 61

1 of the pigment according to Example 1a, 10 g of titanium dioxide (rutile type) and 100 g of a pulverulent copolymer based on acrylonitrile/butadiene/styrene are mixed and the mixture is compounded on a roll mill at 140°–180° C. A reddish-tinged yellow-coloured hide is obtained and is granulated and the granules are injection-moulded in an injection-moulding machine at 200°–250° C. Reddish-tinged yellow moulded articles of very good fastness to light and migration and excellent stability to heat are obtained.

Plastics based on cellulose acetate, cellulose butyrate and mixtures thereof can be coloured in shades with similar fastness properties in a similar manner, but at temperatures of 180°–220° C. and without the addition of titanium dioxide.

EXAMPLE 62

0.2 g of finely divided pigment according to Example 1a is mixed with 100 g of a plastic based on polycarbonate in an extruder or in a kneading screw at 250°–280° C. and the mixture is processed to, granules. Reddish-tinged yellow, transparent granules of outstanding fastness to light and stability to heat are obtained.

EXAMPLE 63

90 g of a slightly branched polypropylene glycol with a molecular weight of 2,500 and a hydroxyl number of 56, 0.25 g of endoethylenepiperazine, 0.3 g of tin-II octoate, 1.0 g of a polyether siloxane, 3.5 g of water and 12.0 g of a paste of 10 g of the pigment according to Example 1a in 50 g of the polypropylene glycol indicated are mixed thoroughly with one another, the mixture is then mixed intimately with 45 g of toluylene diisocyanate (80% of the 2,4-isomer and 20% of the 2,6-isomer), and the final mixture is poured into a mould. After 6 seconds, the mixture becomes cloudy and foams. After 70 seconds, an intensely reddish-tinged yellow-coloured, soft polyurethane foam has formed, the pigmentation of which has outstanding fastness to light.

EXAMPLE 64

90 g of a slightly branched polyester of adipic acid, diethylene glycol and trimethylolpropane which has a molecular weight of 2,000 and a hydroxyl number of 60 are mixed with the following components: 1.2 g of dimethylbenzylamine, 2.5 g of sodium castor oil-sulphate, 2.0 g of an oxyethylated, benzylated hydroxydiphenyl, 1.75 g of water and 12 g of a paste prepared by grinding 10 g of the pigment according to Example 1a in 50 g of the abovementioned polyester. After the mixing, 40 g of toluylene diisocyanate (65% of the 2,4-isomer and 35% of the 2,6-isomer) are stirred in and the mixture is poured into a mould and foamed. After 60 seconds, a reddish-tinged yellow-coloured, soft polyurethane foam has formed, the coloration of which is distinguished by very good fastness to light.

EXAMPLE 65

Deep reddish-tinged yellow offset prints of high brilliancy and very good fastness to light and lacquering are obtained with a printing paste prepared by grinding 35 g of the pigment according to Example 1a with 65 g of linseed oil and adding 1 g of siccative (Co naphthenate, 50% strength in white spirit). Using this printing paste in letterpress printing, collotype printing, lithographic printing or die stamping leads to reddish-tinged yellow prints with similar fastness properties. If the pigment is used for colouring tinplate printing pastes or low-viscosity gravure printing pastes or printing inks, reddish-tinged yellow prints with similar fastness properties are obtained.

EXAMPLE 66

A printing paste is prepared from 10 g of the fine pigment paste indicated in Example 57, 100 g of 3% strength tragacanth gum, 100 g of an aqueous 50% strength egg albumin solution and 25 g of a non-ionic wetting agent. A textile fibre fabric is printed with this paste and steamed at 100° C. and a reddish-tinged yellow print which is distinguished by excellent fastness properties, in particular fastness to light, is obtained. Other binders which can be used for fixing the pigment onto the fibre, for example binders based on synthetic resin, or British gum or cellulose glycolate, can be used in the printing formulation instead of the tragacanth gum and egg albumin.

EXAMPLE 67

A mixture of 100 g of light crepe, 2.6 g of sulphur, 1 g of stearic acid, 1 g of mercaptobenzthiazole, 0.2 g of hexamethylenetetramine, 5 g of zinc oxide, 60 g of chalk and 2 g of titanium dioxide (anatase type) is compounded on a mixing mill at 50° C. and coloured with 2 g of the pigment obtained according to Example 1a, and the final mixture is then vulcanised at 140° C. for 12 minutes. A reddish-tinged yellow-coloured vulcanisation product of very good fastness to light is obtained.

EXAMPLE 68

22.5 l of an aqueous, approximately 9% strength viscose solution are added to 100 g of a 20% strength aqueous paste of the pigment according to Example 1a, in a stirred apparatus, which has been prepared, for example, by dissolving the pigment in 96% strength sulphuric acid, discharging the solution onto ice, filtering the mixture and washing the material on the filter with water until neutral. The coloured composition is stirred for 15 minutes and then deaerated and subjected to a spinning and desulphurising process. Reddish-tinged yellow filaments of films with very good fastness to light are obtained.

EXAMPLE 69

10 kg of paper pulp containing 4 g of cellulose per 100 g are treated in a hollander for about 2 hours. During this period, 4 g of rosin size, then 30 g of an approximately 15% strength pigment dispersion obtained by grinding 4.8 g of the pigment obtained according to Example 1a with 4.8 g of dinaphthylmethanedisulphonic acid and 22 g of water in a ball mill, and then 5 g of aluminium sulphate are added, in each case at intervals of a quarter of an hour.

After finishing on a paper-making machine, reddish-tinged yellow-coloured paper of outstanding fastness to light is obtained.

EXAMPLE 70

The yellow-pigmented paper produced according to Example 69 is impregnated with a 55% strength solution of a urea/formaldehyde resin in n-butanol and baked at 140° C. Reddish-tinged yellow laminated paper of very good fastness to migration and outstanding fastness to light is obtained.

Laminated paper with the same fastness properties is obtained by laminating paper which has been printed, by the gravure printing process, with a printing paste containing the fine yellow pigment paste described in Example 57 and water-soluble or saponifiable binders.

EXAMPLE 71

20 g of the pigment obtained according to Example 1a are finely dispersed in 50 g of dimethylformamide in a bead mill, using a dispersing agent consisting of 50 g of a 10% strength solution of polyacrylonitrile in dimethylformamide. The pigment concentrate thus obtained is added to a spinning solution of polyacrylonitrile in a known manner and the spinning solution is homogenised and then spun to filaments by known dry spinning processes or wet spinning processes.

Reddish-tinged yellow-coloured filaments, the colorations of which are distinguished by very good fastness to rubbing, washing, migration, heat, light and weathering, are obtained.

We claim:

1. Anthraquinone-azomethine compounds of the formula

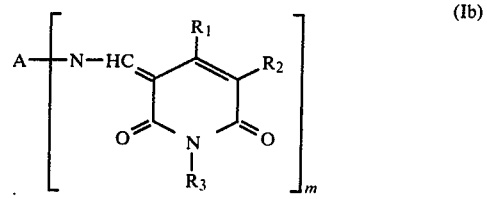

or of the tautomeric formula

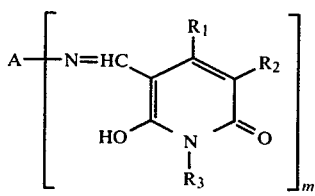

or of the tautomeric formula

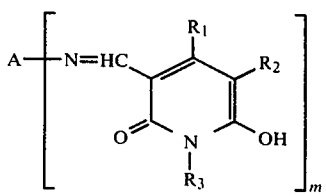

in which

A denotes an anthraquinone radical which is free from sulphonic acid groups and optionally further substituted, $R_1$ denotes hydrogen, $C_1$–$C_4$-alkyl, hydroxy-$C_1$–$C_4$-alkyl, phenyl, phenyl substituted by halogen, $C_1$–$C_4$ alkyl, $C_1$–$C_4$ alkoxy, nitro, trifluoromethyl, cyano, carbamoyl, carbamoyl substituted by $C_1$–$C_4$ alkyl, phenyl, substituted phenyl with a substituent of $C_1$–$C_4$ alkyl, $C_1$–$C_4$ alkoxy, fluorine, chlorine, bromine or nitro or benzyl, sulfamoyl, sulfamoyl substituted by $C_1$–$C_4$ alkyl, phenyl which in turn is optionally further substituted by $C_1$–$C_4$ alkyl, $C_1$–$C_4$ alkoxy, fluorine, chlorine, bromine or nitro or benzyl, acylamino, or arylamino, carboxyl, carboxylic acid, $C_1$–$C_4$ alkyl ester or hydroxyl, $R_2$ denotes hydrogen, halogen, nitro, cyano, carbamoyl, or sulfamoyl, substituted carbamoyl or substituted sulfamoyl where the substituent is $C_1$ to $C_4$ alkyl, phenyl which in turn can be itself substituted by $C_1$ to $C_4$ alkyl, $C_1$ to $C_4$ alkoxy, fluorine, chlorine, bromine or nitro or benzyl, sulfonic acid $C_1$–$C_4$ alkyl ester, sulphonic acid aryl ester, $C_1$–$C_4$ alkylcarbonyl, $C_1$–$C_4$-alkoxycarbonyl, benzoyl, benzoyl substituted by halogen, $C_1$–$C_4$ alkyl, $C_1$–$C_4$ alkoxy, nitro, trifluoromethyl, cyano, carbamoyl, sulfamoyl, carbamoyl or sulfamoyl substituted by $C_1$–$C_4$ alkyl, phenyl which in turn can be substituted by $C_1$–$C_4$ alkyl, $C_1$–$C_4$ alkoxy, fluorine, chlorine, or bromine or nitro, or benzyl, acylamino or arylamino, alkyl or phenyl sulphone, or phenyl sulphone substituted by halogen, $C_1$–$C_4$ alkyl, $C_1$–$C_4$ alkoxy, nitro, trifluoromethyl, cyano, carbamoyl, sulfamoyl, acylamino, arylamino, substituted carbamoyl or substituted sulfamoyl where the substituent is $C_1$–$C_4$ alkyl, alkyl which in turn can be substituted by $C_1$–$C_4$ alkyl, $C_1$–$C_4$ alkoxy, fluorine, chlorine bromine or nitro or benzyl, or a hetero-aromatic radical of the formula

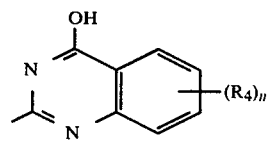

or of the formula

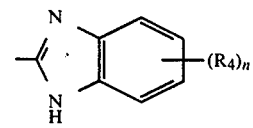

or of the formula

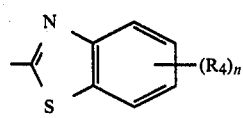

R$_3$ denotes aryl, aryl substituted by halogen, C$_1$-C$_4$ alkyl, C$_1$-C$_4$ alkoxy, nitro, trifluoromethyl, cyano, carbamoyl, sulfamoyl, acylamino, arylamino, substituted carbamoyl or substituted sulfamoyl where the substituent is C$_1$ to C$_4$ alkyl, phenyl which in turn can be substituted by C$_1$ to C$_4$ alkyl, C$_1$-C$_4$ alkoxy, fluorine, chlorine, bromine or nitro or benzyl or heteroaryl where the aryl radical of the heteroaryl moiety can be substituted in the same manner as said substituted aryl, cycloalkyl or C$_1$-C$_{12}$ alkyl, it being possible for the alkyl chain to be interrupted by oxygen or sulfur and/or substituted by hydroxyl, N(R$_5$)$_2$— or —N(R$_5$)$_3$⊕X⊖ groups R$_4$ denotes halogen, C$_1$-C$_4$ alkyl, C$_1$-C$_4$ alkoxy, nitro, trifluoromethyl, cyano, carboxamide, sulphonamide, acylamino, or arylamino, R$_5$ denotes hydrogen, C$_1$-C$_4$ alkyl, cycloalkyl, aryl or substituted aryl substituted by halogen, C$_1$-C$_4$ alkyl, C$_1$-C$_4$ alkoxy, nitro, trifluoromethyl, cyano, carbamoy, sulfamoyl, acylamino, arylamino, substituted carbamoyl or substituted sulfamoyl where the substituent is C$_1$-C$_4$ alkyl, phenyl which in turn can be substituted by C$_1$-C$_4$ alkyl, C$_1$-C$_4$ alkoxy, fluorine, chlorine, bromine, or nitro, or benzyl, X denotes an anion, m denotes 1, 2, 3 or 4 and n denotes 0, 1, 2, 3 or 4.

2. Anthraquinone-azomethine compounds which, in one of their tautomeric structures, correspond to the formula

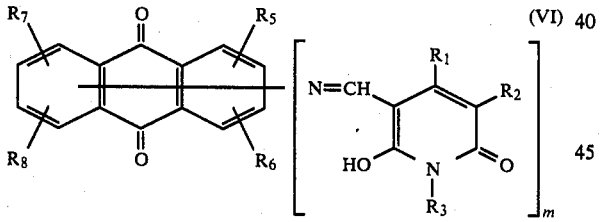

wherein

R$_1$, R$_2$, R$_3$ and m have the abovementioned meaning,

R$_5$ denotes hydrogen, halogen, nitro, C$_1$-C$_4$-alkyl, C$_1$-C$_4$-alkoxy, C$_1$-C$_4$-alkylamino, benzylamino, cyclohexylamino, C$_1$-C$_4$-alkylmercapto, phenylmercapto which is optionally substituted by C$_1$-C$_4$-alkyl, C$_1$-C$_4$-alkoxy, fluorine, chlorine, bromine or nitro, C$_1$-C$_4$-alkylcarbonyl, C$_1$-C$_4$-alkoxycarbonyl, phenylamino which is optionally substituted by C$_1$-C$_4$-alkyl, C$_1$-C$_4$-alkoxy, chlorine or nitro, carbamoyl which is optionally monosubstituted or disubstituted by C$_1$-C$_4$-alkyl, benzyl or phenyl, it being possible for phenyl to be substituted by C$_1$-C$_4$-alkyl, C$_1$-C$_4$-alkoxy, fluorine, chlorine, bromine or nitro, carboxyl, hydroxyl, C$_1$-C$_4$-alkylcarbonylamino, benzoylamino which is optionally substituted by C$_1$-C$_4$-alkyl, C$_1$-C$_4$-alkoxy, chlorine, bromine or nitro, or benzenesulphonylamino which is optionally substituted by C$_1$-C$_4$-alkyl, C$_1$-C$_4$-alkoxy, fluorine, chlorine, bromine or nitro, R$_6$ denotes hydrogen, chlorine, hydroxyl or methyl, R$_7$ denotes hydrogen, halogen, nitro, C$_1$-C$_4$-alkyl, C$_1$-C$_4$-alkoxy, C$_1$-C$_4$-alkylamino, C$_1$-C$_4$-alkylmercapto, phenylmercapto which is optionally substituted by C$_1$-C$_4$-alkyl, C$_1$-C$_4$-alkoxy, fluorine, chlorine, bromine or nitro, C$_1$-C$_4$-alkoxycarbonyl, C$_1$-C$_4$-alkylcarbonyl, benzylamino, cyclohexylamino, phenylamino which is optionally substituted by C$_1$-C$_4$-alkyl, C$_1$-C$_4$-alkoxy, chlorine, bromine or nitro, carboxyl, hydroxyl, carbamoyl which is optionally monosubstituted or disubstituted by C$_1$-C$_4$-alkyl, benzyl or phenyl, it being possible for phenyl to be substituted by C$_1$-C$_4$-alkyl, C$_1$-C$_4$-alkoxy, fluorine, chlorine, bromine or nitro, C$_1$-C$_4$-alkylcarbonylamino, benzoylamino which is optionally substituted by C$_1$-C$_4$-alkyl, C$_1$-C$_4$-alkoxy, chlorine, bromine or nitro, C$_1$-C$_4$-alkanesulphonylamino, or benzenesulphonylamino which is optionally substituted by C$_1$-C$_4$-alkyl, C$_1$-C$_4$-alkoxy, fluorine, chlorine, bromine or nitro and R$_8$ denotes hydrogen, halogen, or hydroxyl.

3. Anthraquinone-azomethine compounds which, in one of their tautomeric structures, correspond to the formula

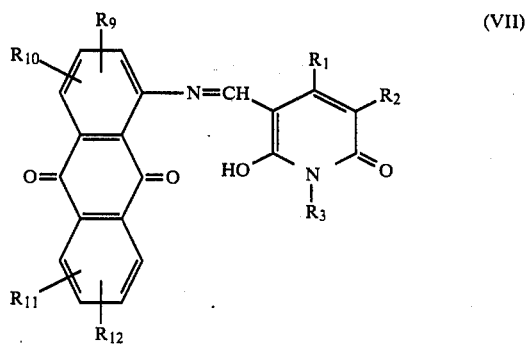

wherein

R$_1$, R$_2$ and R$_3$ have the abovementioned meaning and R$_9$, R$_{10}$, R$_{11}$ and R$_{12}$ denote hydrogen, chlorine, bromine, carboxyl, C$_1$-C$_4$-alkoxycarbonyl, carbamoyl, C$_1$-C$_4$-alkylcarbonylamino, benzoylamino which is optionally substituted by 1 or 2 nitro groups or 1 to 5 chlorine or bromine atoms, C$_1$-C$_4$-alkanesulphonylamino, benzenesulphonylamino which is optionally substituted by methyl, methoxy or chlorine, or a radical of the formula

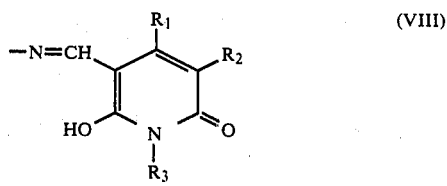

* * * * *